(12) United States Patent
Hartman et al.

(10) Patent No.: US 8,004,226 B2
(45) Date of Patent: Aug. 23, 2011

(54) METHOD AND SYSTEM FOR DETECTING A FAILED CURRENT SENSOR IN A THREE-PHASE MACHINE

(75) Inventors: Mark E. Hartman, Peoria, IL (US);
Jesse R. Gerdes, Dunlap, IL (US);
Gregory J. Speckhart, Peoria, IL (US);
Jackson Wai, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 447 days.

(21) Appl. No.: 12/222,275

(22) Filed: Aug. 6, 2008

(65) Prior Publication Data

US 2010/0033122 A1 Feb. 11, 2010

(51) Int. Cl.
*H02H 7/08* (2006.01)
*G05B 23/00* (2006.01)
*G05B 13/00* (2006.01)

(52) U.S. Cl. ........ 318/490; 318/474; 318/565; 340/648; 700/45; 700/46

(58) Field of Classification Search ............. 318/400.21, 318/474, 432, 434, 490, 565; 340/648; 700/45, 700/46
See application file for complete search history.

(56) References Cited

U.S. PATENT DOCUMENTS

| | | | | |
|---|---|---|---|---|
| 4,475,150 A * | 10/1984 | D'Atre et al. | .................... | 363/51 |
| 4,509,110 A | 4/1985 | Levesque, Jr. et al. | | |
| 4,679,136 A | 7/1987 | Shigemasa | | |
| 4,695,941 A * | 9/1987 | Kumar | ............................ | 700/45 |
| 5,357,181 A * | 10/1994 | Mutoh et al. | ................... | 318/139 |
| 5,661,380 A * | 8/1997 | Obara et al. | ................... | 318/139 |
| 5,677,611 A * | 10/1997 | Yoshihara et al. | ............ | 318/803 |
| 5,739,649 A * | 4/1998 | Akao | ............................ | 318/139 |
| 6,009,003 A * | 12/1999 | Yeo | ................................. | 363/37 |
| 6,054,827 A | 4/2000 | Takatsuka et al. | | |
| 6,433,504 B1 | 8/2002 | Branecky | | |
| 6,532,405 B1 * | 3/2003 | Kumar et al. | ................... | 701/19 |

(Continued)

FOREIGN PATENT DOCUMENTS

JP 6-253585 9/1994

OTHER PUBLICATIONS

U.S. Appl. No. 11/987,544, filed Nov. 30, 2007.

*Primary Examiner* — Rita Leykin
(74) *Attorney, Agent, or Firm* — Finnegan, Henderson, Farabow, Garrett & Dunner LLP

(57) ABSTRACT

A method of detecting one or more failed current sensor and estimating a phase current for the failed current sensor on a three-phase machine is disclosed. The method may include detecting one or more failed current sensor by determining if an absolute value of a sum of the phase currents of the motor is below an open circuit value. The method may also include determining which phase currents are approximately zero, for each phase current associated with each phase of the motor, if the sum of the phase currents of the motor is not below the open circuit value. The method may further include estimating the phase current for the failed current sensor by determining the phase current value for the failed current sensor, that when added to the phase currents of the remaining current sensors, will make the sum of all the phase currents equal to approximately zero.

19 Claims, 4 Drawing Sheets

U.S. PATENT DOCUMENTS

| | | | |
|---|---|---|---|
| 6,593,714 B2 * | 7/2003 | Nagayama | 318/400.07 |
| 6,720,749 B2 | 4/2004 | Ta et al. | |
| 6,989,641 B2 * | 1/2006 | Schulz et al. | 318/139 |
| 7,091,684 B2 * | 8/2006 | Kobayashi et al. | 318/432 |
| 7,301,296 B1 | 11/2007 | Discenzo | |
| 2008/0042606 A1 | 2/2008 | Chen | |
| 2008/0079385 A1 | 4/2008 | Hashimoto et al. | |
| 2008/0315809 A1 * | 12/2008 | Tamaizumi | 318/400.23 |

* cited by examiner

METHOD AND SYSTEM FOR DETECTING A FAILED CURRENT SENSOR IN A THREE-PHASE MACHINE

TECHNICAL FIELD

This application relates to a power converter control method and system, and more particularly, to a method and system for detecting a failed current sensor, and estimating a value for the failed current sensor, in a three-phase machine.

BACKGROUND

Power converters/inverters are commonly used in a machine for motor control. Power converters/inverters usually include a plurality of power transistors, and these power transistors may be switched on and off to modulate an output voltage from the power converter/inverter. Knowing the state of the current or voltage of each phase of the motor allows for a power converter/inverter to be controlled to produce a controlled power waveform to the motor. Sensors are often deployed to detect the current associated with each phase of the motor. If one or more sensors are producing incorrect current values, the commands and changes in voltage to control the AC motor will not match the actual state of the AC motor, potentially leading to a loss of motor control.

Because accurate detection of phase current is critical to ensuring synchronous operation of the motor, precision sensors are typically provided for each phase of the motor. Some conventional sensor control strategies provide back-up phase current detection schemes, should one or more sensors fail or otherwise become inaccurate or unreliable. Many such sensor control strategies often include a method to detect the failure of one or more of the sensors. A conventional control strategy may first detect if a sensor has failed by summing the detected current for each phase of the AC motor. If the sum is not zero, each detected current may be compared against an estimate value for the current of that phase of the AC motor. A sensor has failed when the detected current for that sensor does not match the estimated current of that sensor. If a current sensor has failed, and an alternate way to control the inputs to an AC motor is not available, the motor may have to be shut down. Therefore, in order to ensure proper operation of the motor in the event of a sensor failure, a relatively simple, inexpensive motor control strategy that can detect a sensor failure and compensate for such failure may be desirable.

One device and method for failure detection in electric vehicles is described in U.S. Pat. No. 5,357,181 to Mutoh et al. ("the '181 patent"). The '181 patent describes a device or method that may detect if one or more current sensors are failing, and provide an alternate way to control the motor to compensate for the failed sensor(s). The system of the '181 patent uses a predetermined maximum current error value, which defines a maximum total current level permitted on the system. The sum of the three phase currents is then compared to this error value to monitor the operating condition of the current sensors. If the summation is below this value, the sensors are in normal condition. If the summation exceeds the error value, the disorder in output from excessive input deviation of current control (the estimate and the sensed signal) is checked at the current control system of each phase. The current sensor of the phase at which a disorder is found is determined to be failing. If only one out of three current sensors is failing, the device or method estimates the current of the failing current sensor by using the two normal current sensors. If two or more current sensors are found to be failing, the motor is controlled based on the AC current reference.

Although the device and method of the '181 patent may provide a method of determining if a current sensor has failed and estimating a value for the failed current sensor, it may include several disadvantages. Specifically, the device and method of the '181 patent may require a large number of components, rendering the system unnecessarily costly and unduly complex. Additionally, because the device and method of the '181 patent maintain an estimate of the current of each phase to aid in the detection of disorder in output from excessive input deviation, small errors in one or more current sensors may cause the estimate of one or more current sensors to drift and, in the event of a current sensor failure, the wrong sensor or sensors may be determined to have failed. Furthermore, the device and method of the '181 patent may not re-qualify a current sensor that has been determined to have failed if that current sensor later begins to perform normally. Thus, in order to facilitate accurate and reliable motor control, a motor control sensor strategy that can detect and accurately correct for a failed sensor, while reducing the cost and complexity of the AC motor control sensor strategy by decreasing the amount of processing and the number of sensors required, is desirable.

The disclosed system and method are directed to improvements in the existing technology.

SUMMARY

In accordance with one aspect, the present disclosure is directed toward a method of detecting one or more failed current sensor and estimating a phase current for the failed current sensor on a three-phase machine. The method may include detecting one or more failed current sensor by determining if an absolute value of a sum of the phase currents of the motor is below an open circuit value. The method may also include determining which phase currents are approximately zero, for each phase current associated with each phase of the motor, if the sum of the phase currents of the motor is not below the open circuit value. The method may further include estimating the phase current for the failed current sensor by determining the phase current value for the failed current sensor, that when added to the phase currents of the remaining current sensors, will make the sum of all the phase currents equal to approximately zero.

According to another aspect, the present disclosure is directed toward a system for detecting one or more failed current sensor and estimating a phase current for the failed current sensor on a three-phase machine. The system may include at least one three-phase machine and at least one sensor deployed per phase of each three-phase machine. The system may further include a controller electrically coupled to the at least one three-phase machine. The controller may be configured to detect one or more failed current sensor. The controller may be configured to determine if an absolute value of a sum of the phase currents of the three-phase machine is below an open circuit value. The controller may also be configured to determine which phase currents are approximately zero, for each phase current associated with each phase of the motor, if the absolute value of the sum of the phase currents of the three-phase machine is not below the open circuit value. The controller may be further configured to estimate the phase current for the failed current sensor by determining the phase current value for the failed current sensor, that when added to the phase currents of the remaining current sensors, will make the sum of all the phase currents equal to approximately zero.

In accordance with yet another aspect, the present disclosure is directed toward a machine. The machine may include a power source and at least one motor, each motor having at least two phases and a current sensor associated with each phase of the motor. The machine may also include a controller electrically coupled to the at least one motor. The controller may be configured to detect one or more failed current sensor. The controller may be configured to determine if an absolute value of a sum of the phase currents of the motor is below an open circuit value. The controller may also be configured to determine which phase currents are approximately zero, for each phase current associated with each phase of the motor, if the absolute value of the sum of the phase currents of the motor is not below the open circuit value. The controller may be further configured to estimate the phase current for the failed current sensor by determining the phase current value for the failed current sensor, that when added to the actual phase currents of the remaining current sensors, will make the sum of all the phase currents equal to approximately zero.

DETAILED DESCRIPTION

Figure 1:
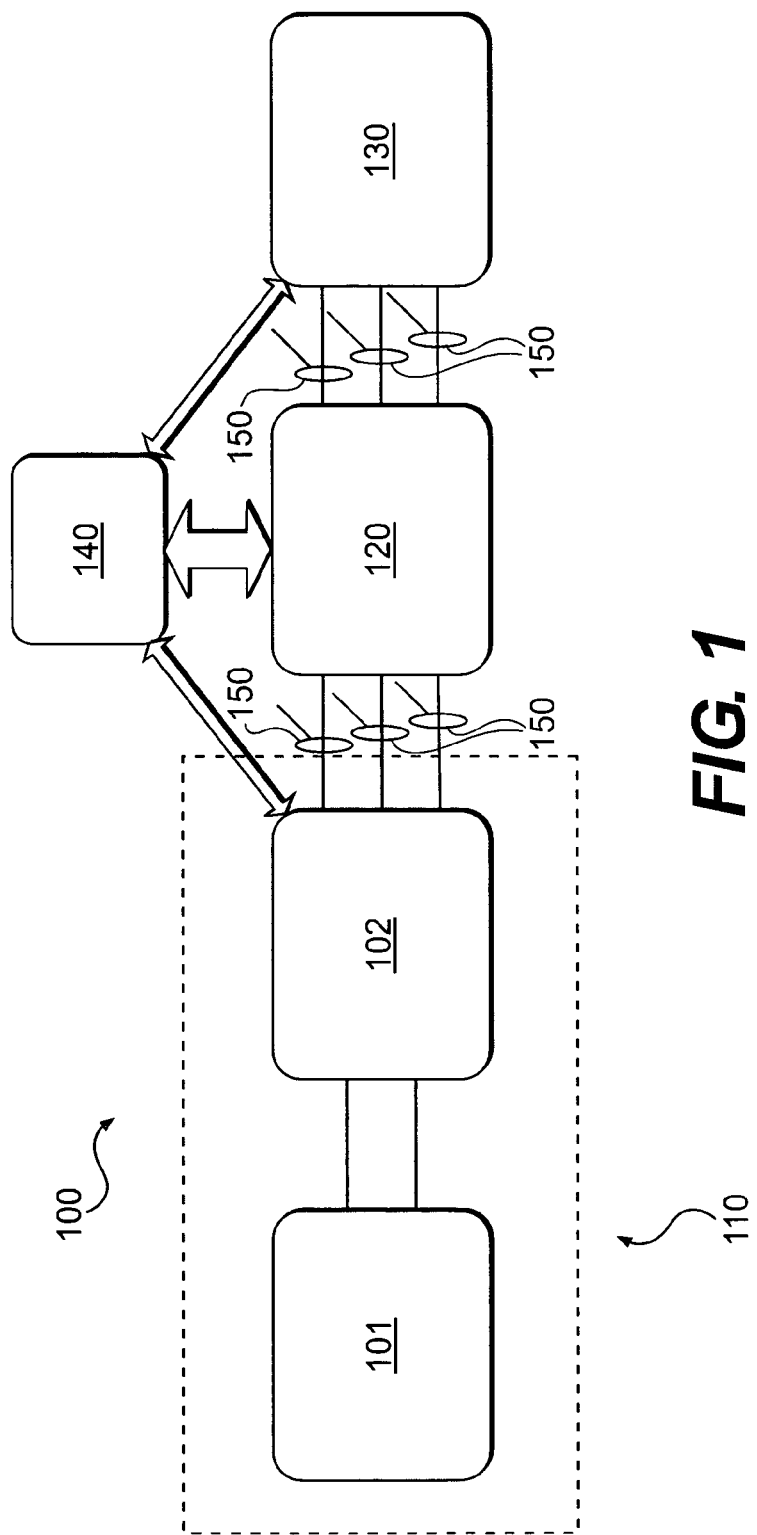
FIG. 1 provides a block diagram of a machine in accordance with an exemplary embodiment of the present disclosure.

FIG. 1 provides a block diagram of a machine in accordance with an exemplary embodiment of the present disclosure. Machine 100 may include, among other things, a power source 110, a power electronics system 120, a traction system 130, and a control system 140. Machine 100, as the term is used herein, refers to a fixed or mobile machine that may perform some type of operation associated with a particular industry, such as mining, construction, farming, etc. Examples of machines include trucks, cranes, earth moving vehicles, mining vehicles, backhoes, material handling equipment, farming equipment, and on-highway vehicles.

Power source 110 may include various components configured to provide electric power for use by one or more systems of machine 100. Power source 110 may include a prime mover 101 and a generator 102 driven by prime mover 101. Prime mover 101 may be a combustion engine, such as, for example, a diesel engine, or may be a hybrid motor. Generator 102 may be an AC generator, otherwise known as an alternator, that generates alternating current by rotating a coil in the magnetic field or by rotating a magnetic field within a stationary coil. Alternatively, power source 110 may include any other suitable device for providing an electrical power output such as, for example, a battery, a fuel cell, or any other type of power source configured to provide electrical power to machine 100.

Power electronics system 120 may include at least one power converter. Examples of power converters may include a power inverter that converts DC current to AC power and a power rectifier that converts AC current to DC power. Each power converter may have at least one phase, and each phase may include at least one power transistor. Each power transistor may be switched on and off by its corresponding gate driving circuit. The power transistors may be switched according to a switching scheme, such as a pulse width modulation (PWM), to modulate the voltage that is output from the power converter. While three-phase machine may indicate a machine using three-phase power, three-phase machine may also include machines with multiples of three phases, i.e., for example, a six-phase machine, or a nine-phase machine.

Power electronics system 120 may be electrically coupled to power source 110 via a first set of conductors, and to traction system 130 via a second set of conductors. Traction system 130 may include at least one electric load, such as an electric motor. Power electronics system 120 may be configured to convert power provided by power source 110 into power forms appropriate for consumption by traction system 130. Power electronics system 120, for example, may include a power rectifier to convert AC voltage supplied by power source 110 to a DC voltage output, and may further include a power inverter to convert the DC voltage to an AC voltage of a certain waveform. Power electronics system 120 may provide voltage and/or current outputs to drive traction system 130 and/or control system 140.

Traction system 130 may include at least one electric load, such as an electric motor for one or more ground-engaging devices for propelling machine 100. The at least one electric load may be directly coupled to power source 110, or may be coupled to power source 110 via the power electronics system 120. Each electric load may have at least one phase and may be connected with a power converter with an equal number of phases in the power electronics system 120. One example of the electric load may be an electric motor, such as an AC induction motor, a brushless DC motor, a stepper motor, a linear motor, or any other type of motor.

Control system 140 may be coupled to power electronics system 120 and configured to provide gate driving signals to the power transistors based on a pre-programmed switching scheme. Control system 140 may be an integral part of power electronics system 120, or, alternatively, control system 140 may be external to power electronics system 120, for example, as part of a separate electronic control module (ECM) associated with machine 100. Control system 140 may also be coupled to traction system 130 and/or power source 110 to perform one or more control functions. Control system 140 may be further coupled to generator 102 to perform one or more control functions. Control system 140 may further be configured to receive feedback from a plurality of points in the circuit and adjust the control signals based on the feedback. For example, control system 140 may be configured to communicate with current sensors 150 associated with the power electronics system 120, generator 102, and/or traction system 130, determine the current of each phase of a motor or the generator, determine if any of current sensors 150 have failed, determine appropriate control signals based on current sensor 150 measurements, and send the control signals to power electronics system 120.

Control system 140 may be configured to detect one or more failed current sensors and estimate a phase current for one failed current sensor on a three-phase machine. According to one embodiment, control system 140 may be configured to detect a failed current sensor by determining if the sum of the phase currents of a motor is below an open circuit value. If the sum of the phase currents of a motor is below an open circuit value the sensors are operating normally, but if the sum of the phase currents of a motor is above an open circuit value, one or more current sensors 150 may have failed. Because the sum of currents of the phases of a properly operating three-phase machine should ideally be approximately zero, a non-zero sum may be indicative of a problem (either with the motor or with a current sensor 150 associated therewith). The open circuit value is the maximum allowable value of the sum of the phase currents of the phases of a properly operating three-phase machine. If the sum of the phase currents of the motor is not below the open circuit value, control system 140 may be configured to determine which phase currents are approximately zero, for each phase current associated with each phase of the motor. Control system 140 may be further configured to estimate a phase current for the failed current sensor by determining a phase current value for the failed current sensor, that when added to the phase currents of the remaining current sensors 150 may make the sum of all the phase currents approximately equal to zero.

Machine 100 may include two or more current sensors 150 deployed among power electronics system 120 and a traction system 130. Current sensors 150 may detect or monitor the phase currents associated with a phase of a three-phase machine, and may report those phase currents as an analog or discrete value to control system 140 or other controllers on machine 100. In one exemplary embodiment, current sensors 150 may be deployed to detect the phase current of each phase of a motor, and automatically report the detected values to control system 140. Current sensors 150 may provide information associated with an operational condition, such as, for example, the magnitude of a phase current, the frequency of a phase current, the polarity of the phase current and a complete profile of the phase current as a function of time or frequency. Current sensor 150 measurements may be indicative of the characteristics of the electric loads that power electronics system 120 drives, for example, traction system 130.

Detecting one or more failed current sensors and estimating a phase current for one failed current sensor may help prevent a motor from being damaged or rendered inoperative. For instance, when the control signals that are delivered to a power converter produce an AC voltage waveform not appropriate for a three-phase machine, the motor may be damaged or rendered inoperative. This may occur when one or more of current sensors 150 has failed and control system 140 is no longer receiving correct inputs. When control system 140 is not receiving correct inputs, control system 140 may send controls to the power converter which may produce an irregular or uncontrolled output to drive the three-phase machine. The irregular or uncontrolled output from the power converter may damage other power components connected in the circuit. For example, power source 110, power electronics system 120, and/or traction system 130 may contain highly sensitive electronic circuits, which may be damaged by an irregular or uncontrolled output.

Figure 2:
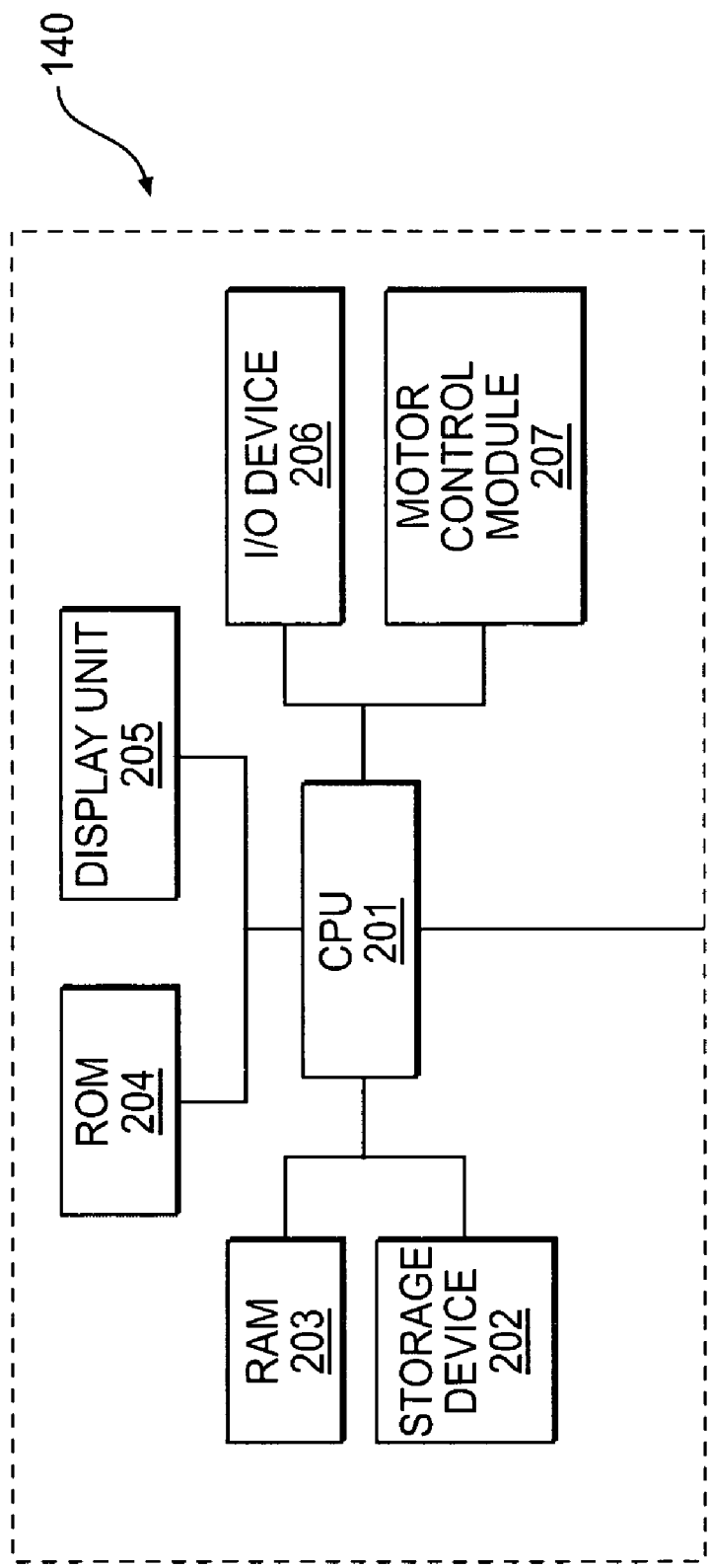
FIG. 2 provides a diagrammatic illustration of a control system, in accordance with an exemplary embodiment of the present disclosure.

FIG. 2 provides a diagrammatic illustration of a control system 140, in accordance with an exemplary embodiment of the present disclosure. As illustrated in FIG. 2, control system 140 may include one or more hardware components and/or software applications that cooperate to monitor, analyze, and/or control performance or operation of one or more machines 100. Control system 140 may include any computing system configured to receive, analyze, transmit, and/or distribute performance data associated with machine 100.

Control system 140 may include hardware and/or software components that perform processes consistent with certain disclosed embodiments. For example, as illustrated in FIG. 2, control system 140 may include a central processing unit (CPU) 201; one or more computer-readable memory devices such as storage device 202, a random access memory (RAM) 203, and a read-only memory (ROM) 204; a display unit 205; an input/output (IO) device 206; and/or a motor control module 207. The components described above are exemplary and not intended to be limiting. Furthermore, it is contemplated that control system 140 may include alternative and/or additional components than those listed above, such as, for example, one or more field-programmable gate arrays (FPGAs).

CPU 201 may be one or more processors that execute instructions and process data to perform one or more processes consistent with certain disclosed embodiments. For instance, CPU 201 may execute software that enables control system 140 to request and/or receive performance data from current sensors 150 on machine 100. CPU 201 may also execute software that stores collected performance data in storage device 202. In addition, CPU 201 may execute software that enables control system 140 to analyze performance data collected from machine 100 and detect one or more failed current sensor and estimate a phase current for the failed current sensor on a three-phase machine. According to one embodiment, CPU 201 may access computer program instructions stored in memory. CPU 201 may then execute sequences of computer program instructions stored in computer-readable medium devices such as, for example, a storage device 202, RAM 203, and/or ROM 204 to perform methods consistent with certain disclosed embodiments, as will be described below.

One or more computer-readable medium devices may include storage devices 202, RAM 203, ROM 204, and/or any other magnetic, electronic, flash, or optical data computer-readable medium devices configured to store information, instructions, and/or program code used by CPU 201 of control system 140. Storage devices 202 may include magnetic hard-drives, optical disc drives, floppy drives, flash drives, or any other such information storing device. RAM 203 may include any dynamic storage device for storing information and instructions by CPU 201. RAM 203 also may be used for storing temporary variables or other intermediate information during execution of instructions to be executed by CPU 201. During operation, some or all portions of an operating system (not shown) may be loaded into RAM 203. In addition, ROM 204 may include any static storage device for storing information and instructions by CPU 201.

Display unit 205 may include a display including a graphical user interface (GUI) for outputting information on a monitor. Display unit 205 may include one or more displays that may be useful in testing and/or troubleshooting control system 140 and/or motor control module 207. I/O device 206 may include one or more components configured to communicate information associated with control system 140. For example, I/O device 206 may include an integrated keyboard and mouse to allow a user to input commands or instructions for control system 140. I/O devices 206 may include one or more peripheral devices, such as, for example, printers, cameras, disk drives, microphones, speaker systems, electronic tablets, bar code readers, or any other suitable type of I/O device 206.

Control system 140 may include a hardware or software motor control module 207 configured to receive/collect certain performance data from current sensors 150, and detect, based on the received performance data, one or more failed current sensor and estimate a phase current for the failed current sensor on a three-phase machine. Motor control module 207 may be implemented or partially implemented on a FPGA. The FPGA may relieve CPU 201 of some of the processing burden of implementing the disclosed method and system. The FPGA may execute the method and system every cycle that current sensors 150 sample the phase current for a respective phase. Motor control module 207 may be further configured to detect a failed current sensor by determining if the absolute value of the sum of the phase currents of a motor is below an open circuit value. If the sum of the phase currents of a motor is below an open circuit value the sensors are operating normally, but if the sum of the phase currents of a motor is above an open circuit value, one or more current sensors 150 may have failed. If the sum of the phase currents of the motor is not below the open circuit value, motor control module 207 may be configured to determine which phase currents are approximately zero, for each phase current associated with each phase of the motor. Motor control module 207 may be further configured to estimate a phase current for the failed current sensor by determining a phase current value for the failed current sensor, that when added to the phase currents of the remaining current sensors 150, may make the sum of all the phase currents approximately equal to zero.

Figure 3:
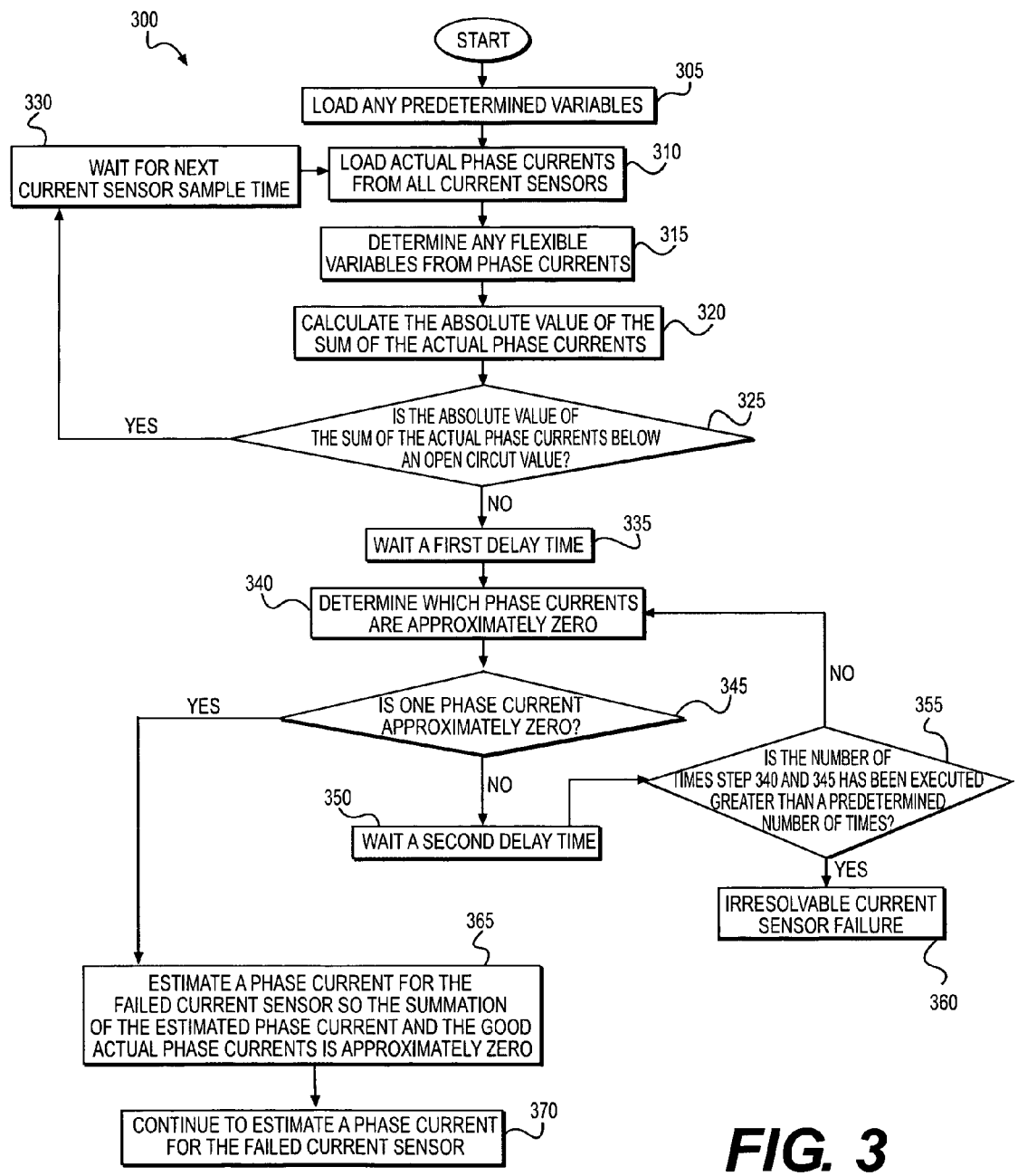
FIG. 3 provides a flowchart of an exemplary method for detecting one or more failed current sensor and estimating a phase current for the failed current sensor on a three-phase machine, in accordance with an exemplary embodiment of the present disclosure.

FIG. 3 illustrates a flowchart 300 depicting an exemplary method for detecting one or more failed current sensor and estimating a phase current for the failed current sensor on a three-phase machine. As illustrated in FIG. 3, predetermined variables may be loaded from control system 140 on machine 100 (Step 305). For example, motor control module 207 of control system 140 may contain one or more predetermined variables used in the method. Some exemplary embodiments of predetermined variables may include an open circuit value, a value for "approximately zero", a first delay, a second delay, and a predetermined number of times in a row that may be used to determine when an irresolvable sensor failure has occurred. The values assigned to these predetermined variables may be machine-dependant.

According to one exemplary embodiment, the open circuit value may be a predetermined and/or user-defined value to which the absolute value of the sum of the phase currents is compared. The open-circuit value may serve as a benchmark by which control system 140 determines whether the sum of the phase currents of the motor can be estimated as approximately zero. For example, in large motors the open circuit value may be set to 50 amps. In other examples, the open circuit value may be as low as a few amps in a small motor, and may be much higher in a large motor, such as 300 amps. In other examples, the open circuit value may be a percentage of the expected maximum current of a phase, such as 25 percent. The percentage may be much lower, perhaps a few percent, or may range as high as 40 percent.

According to another exemplary embodiment, a phase current or a summation of phase currents may be compared to a number, such as, approximately zero. Because the sum of all phase currents in a balanced, three-phase machine should be at or near zero, the phase current or summation of phase currents may be compared with a threshold current value of approximately zero. In some cases, particularly where the energizing current required to drive the motor is on the order of several hundred Amps, 10 to 20 Amps may be considered "approximately zero", for the purposes of phase current detection. In other examples, approximately zero may be as low as one amp in a small motor, and may be much higher in a large motor, such as a 100 amps. In other examples, approximately zero may be a percentage of the expected maximum current of a phase, such as 10 percent. The percentage may be much lower, perhaps one percent, or may range as high as 20 percent.

According to another exemplary embodiment, a first delay may be a time duration between the execution of two steps, depending on the fall time of the open sensor or the decay time based on the ECM circuit. First delay may be between 100 microseconds and one millisecond. Second delay may be a time duration associated with the time a properly working current sensor 150 reading approximately zero may need to no longer read an approximately zero value. Second delay may be greater than the time it would take a phase current to cross the approximately zero magnitude range. Second delay may be less than the time it would take a phase current to once again enter the approximately zero magnitude range. In one exemplary embodiment, in a 60 hertz motor, second delay may be as little as 500 microseconds and as long as 6 milliseconds. Second delay may have a smaller lower bound and/or a higher upper bound, depending on with width of the approximately zero range, and the frequency of the waveform to the motor.

According to another exemplary embodiment, control system 140 may be configured to detect the number of times in a row that two or more current sensors 150 indicate that they are approximately zero simultaneously. For example, because current sensors 150 may be configured to detect a threshold range about "absolute" zero, there may be situations where one current sensor 150 is within the approximate zero range, while another current sensor 150 may have failed. Thus, there may be situation where more than one current sensor 150 appears to be in the "approximately zero" state, which may generate a "false positive" indication that two or more of the phases of the motor are not operating appropriately. Consequently, control system 140 may be configured to identify and count such erroneous "false positives." If the number of consecutive "false positives" exceeds a predetermined user-defined threshold, such as, a predetermined number of times in a row, control system 140 may provide an indication that a problems exists with two or more current sensors 150. A predetermined number of times in a row may be as low as twice, and may be as high as 20 or 30.

Once the predetermined variables are loaded, the values of the actual phase currents may be collected from current sensors 150 on machine 100 (Step 310). For example, motor control module 207 of control system 140 may receive/collect the values of the actual phase currents for a motor in traction system 130 or each power converter in power electronics system 120. According to one embodiment, current sensors 150 may provide the sampled values for the phase currents to an FPGA, which may execute one or more of the steps described below. According to another embodiment, motor control module 207 may automatically receive the actual phase current values from a performance diagnostic system that may be monitoring one or more systems on machine 100. Alternatively or additionally, motor control module 207 may provide a data request to each current sensor 150 or performance diagnostic system and receive actual phase current values from each current sensor 150 or performance diagnostic system in response to the request.

Once phase current values have been collected, one or more flexible variables may be determined from the phase currents (Step 315). According to one embodiment, after collection of actual phase current values, motor control module 207 may determine one or more flexible variables from phase currents. For example, the open circuit value may be calculated based on the phase currents measured in Step 310. In one exemplary embodiment, the open circuit value may be a percentage of the maximum value of the largest magnitude of the phase currents, such as 25 percent. The percentage may be much lower, perhaps a few percent, or may range as high as 40 percent.

Once the flexible variables have been determined, the absolute value of the sum of the actual phase currents may be calculated (Step 320). According to one embodiment, after the flexible variables have been determined, motor control module 207 may calculate the absolute value of the sum of the actual phase currents.

Once the sum of the actual phase currents has been determined, control system 140 may determine whether the absolute value of the sum of the actual phase currents is below an open circuit value (Step 325). According to one embodiment, if the absolute value of the sum of the actual phase currents is less than the open circuit value, motor control module 207 may determine if one or more phase current values are approximately zero. Under ideal conditions, the summation of the phase currents of a three-phase machine would be zero. But due to noise, sensor error, system imbalances, and interference, the summation of the phase currents in a three-phase machine may be close to zero, but not exactly zero. A threshold value is needed, under which the summation may be assumed to be zero, and above which, the summation may be assumed to be non-zero. The threshold value for Step 325 is the open circuit value from either Step 305 or Step 315. If the absolute value of the sum of the actual phase currents is less than the open circuit value, Step 330 may be executed. In contrast, if the absolute value of the sum of the actual phase currents is equal to or greater than the open circuit value, Step 335 may be executed.

If the absolute value of the sum of the actual phase currents is less than the open circuit value, control system 140 may wait for the next current sensor sample time (Step 330). According to one embodiment, motor control module 207 may wait for the next current sensor sample time and then execute Step 310. The sampling frequency of current sensors 150 may be between 5 kHz and 40 kHz. In one exemplary embodiment, the sampling frequency of current sensors 150 may be 20 kHz.

If the absolute value of the sum of the actual phase currents is equal to or greater than the open circuit value, control system 140 may wait a first delay time (Step 335). As discussed above, a first delay may be a time duration between the execution of two steps, depending on the fall time of the open sensor or the decay time based on the ECM circuit. First delay time may be the time needed for a current sensor 150 that has failed to read approximately zero. In one embodiment, when the absolute value of the sum of the actual phase currents is equal to or greater than the open circuit value, the failed current sensor may not yet read zero, as the failed current sensor may take some time to decay to a zero reading.

Once control system 140 has waited a first delay time, control system 140 may determine the phases of the motor for which the phase currents are approximately zero (Step 340). According to one embodiment, after a first delay time, motor control module 207 may determine which phase currents are approximately zero. Under ideal conditions a failed current sensor may have a value of zero. But due to noise and interference, the value of the failed current sensor may be close to zero, but not exactly zero. A threshold value is needed, under which the current sensor may be assumed to be zero, and above which, the value of current sensor 150 may be assumed to be non-zero. The threshold value for Step 340 is the approximately zero value from Step 305.

Once the phase currents that are approximately zero have been determined, control system 140 may determine whether only one phase current is approximately zero (Step 345). According to one embodiment, if there is one failed current sensor reading approximately zero, and there are no phase currents properly at the zero crossing point, control system 140 may determine the failed current sensors. In the case where only one phase current is approximately zero, current sensor 150 corresponding to the zero value may be identified as a failed sensor. If no current sensors 150 have registered a phase current of approximately zero, then the failed current sensor may be producing a non-zero value. If two or more current sensors 150 register a phase current of approximately zero, either two or more current sensors 150 may have failed, or a current sensor 150 may have failed and another current sensor is at a zero-crossing point. If less than one or more than one phase currents is approximately zero, Step 350 may be executed. In contrast, if one phase current is approximately zero, Step 365 may be executed.

If less than one or more than one phase current is approximately zero, control system 140 may wait a second delay time (Step 350). A second delay may include a time duration sufficient to ensure that a zero reading from a valid current sensor 150 is not improperly identified as a sensor failure (at or near a proper zero crossing of the phase current of the motor). In one embodiment, when more than one current sensor 150 value is approximately zero, motor control module 207 may wait a second delay time to allow those phase currents to move away from zero before re-executing Step 345. In another embodiment, if no current sensors 150 are approximately zero, but the absolute value of the actual phase currents is equal to or greater than the open circuit value, either the failed current sensor has not yet decayed to zero, of the failure is not of an open circuit type. In these cases, either additional time is needed to allow the failed current sensor to decay to zero, or the loop created by Steps 340 to 355 may declare an irresolvable current sensor failure after executing a predetermined number of times in a row.

Once control system 140 has waited a second delay time, control system 140 may determine if the number of times Step 340 and 345 has been executed is greater than a predetermined number of times (Step 355). If Steps 340 and 345 have been performed too many times in a row, it may be an indication that two or more current sensors 150 have failed, or that the failed current sensor is producing a non-zero value. If the number of times Step 340 and 345 has been executed is greater than a predetermined number of times, motor control module 207 may next execute Step 360. If the number of times Step 340 and 345 has been executed is less than or equal to a predetermined number of times, motor control module 207 may next execute Step 340.

If the number of times Step 340 and 345 has been executed is greater than a predetermined number of times, control system 140 may determine that an irresolvable current sensor failure has occurred (Step 360). According to one embodiment, motor control module 207 may declare an irresolvable current sensor failure. Either two or more current sensors 150 have failed, or the failed current sensor is producing a non-zero value. If the failed current sensor is producing a non-zero value, it may indicate a non-open circuit current sensor failure. Motor control module 207 may shut down the motor, or may initiate other preprogrammed health and welfare measures to prevent the motor from becoming uncontrolled.

If one phase current is approximately zero, control system 140 may estimate a phase current for the failed current sensor (Step 365). According to one embodiment, motor control module 207 may estimate a phase current for the failed current sensor. An estimated phase current for the failed current sensor may be selected such that the summation of the estimated phase current and the valid actual phase currents may be approximately zero. Under ideal conditions, the summation of the estimated phase current and the valid actual phase currents may have a value of zero. But due to noise and interference, which may not be symmetrically distributed about zero, it may be desirable to bias the estimation by several amps. Such a bias may be as low as a fraction of an amp, and as high as 20 amps.

Once control system 140 has estimated a phase current for the failed current sensor, control system 140 may continue to estimate the phase current each time a sample is taken for the failed current sensor (Step 370). The phase current of the failed current sensor may continue to be estimated by motor control module 207 until the failed current sensor passes a requalification check. The Steps of FIG. 3 may continue to be executed with the phase current for the failed current sensor provided by the estimate. If an additional current sensor 150 is then detected as a failure, an irresolvable current sensor failure may have occurred.

Control system 140 may be configured to store relevant performance data and other information in storage device 202. The information stored may include one or more of the values of the actual phase currents, flexible variables, estimated phase currents, date, time, motor, and power converter. The stored data may be stored in a permanent file, or may be stored in revolving buffer, which can be transferred to a permanent file in the event of an anomaly associated with power electronics system 120 or control system 140.

While certain aspects and features associated with the method described above may be described as being performed by one or more particular components of control system 140, it is contemplated that these features may be performed by any suitable computing system. Specifically, one or more of these features may be performed by a suitably programmed FPGA. Furthermore, the order of steps in FIG. 3 is exemplary only and certain steps may be performed before, after, or substantially simultaneously with other steps illustrated in FIG. 3. For example, in some embodiments, Step 350 and Step 355 may be preformed in reverse order. In another example, Step 335 may be unnecessary, as once a current sensor 150 has failed, the remaining phase currents may be rapidly driven off the zero crossing point.

Another possible variation on the steps of FIG. 3 includes if less than one or more than one phase current is approximately zero in Step 345, control system 140 may periodically repeat Step 345 until either one phase current is approximately zero, and then next perform Step 365, or the currents destabilize and the motor is automatically shut down.

Figure 4:
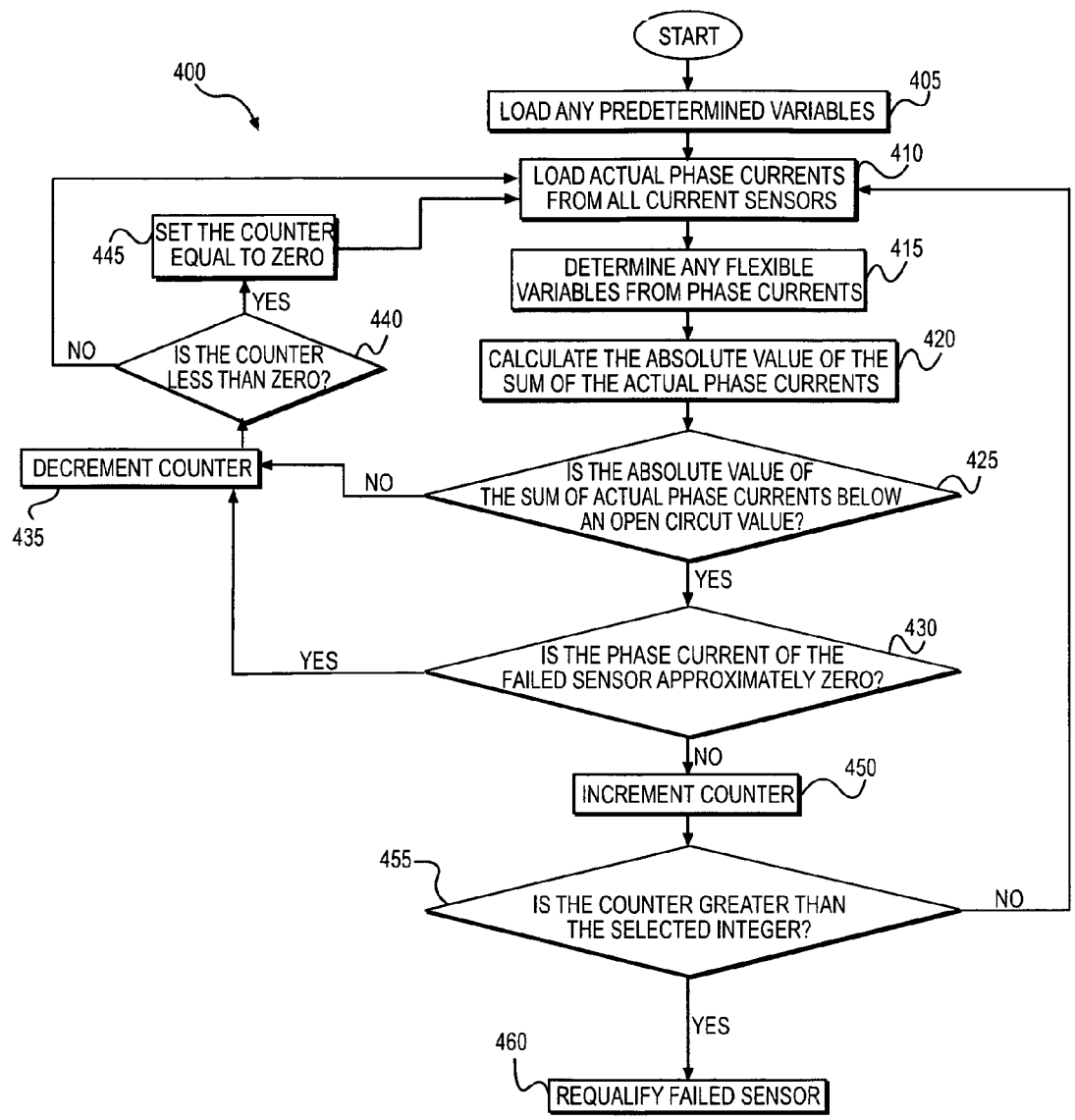
FIG. 4 provides a flowchart of an exemplary method for requalifying a failed current sensor on a three-phase machine, in accordance with an exemplary embodiment of the present disclosure.

FIG. 4 illustrates a flowchart 400 depicting an exemplary method for requalifying a failed current sensor on a three-phase machine. As illustrated in FIG. 4, one or more predetermined variables may be loaded from control system 140 on machine 100 (Step 405). Step 405 may be essentially the same as Step 305, and the similar details will not be repeated. Step 405 may additionally load a selected integer. A selected integer may be a number compared to a counter to determine if a failed current sensor may be requalified. A selected integer may be as low as two, and may be as high as 100. In an alternate embodiment, Step 405 may load from storage device 202 the predetermined variables loaded by Step 305.

Once the predetermined variables are loaded, the values of the actual phase currents may be collected from current sensors 150 on a machine 100 (Step 410). Step 410 may be essentially the same as Step 310, and the similar details will not be repeated. In an alternate embodiment, Step 410 may load from storage device 202 the data loaded by Step 310.

Once phase current values have been collected, flexible variables may be determined from the actual phase currents (Step 415). Step 415 may be essentially the same as Step 315, and the similar details will not be repeated. In an alternate embodiment, Step 415 may load from storage device 202 the data loaded by Step 315.

Once the flexible variables have been determined, the absolute value of the sum of the actual phase currents may be calculated (Step 420). According to one embodiment, after the flexible variables have been determined, motor control module 207 may calculate the absolute value of the sum of the actual phase currents. Step 420 may be essentially the same as Step 320, and the similar details will not be repeated. In an alternate embodiment, Step 420 may load from storage device 202 the data calculated by Step 320.

Once the sum of the actual phase currents has been determined, whether the absolute value of the sum of the actual phase currents is below an open circuit value may be determined (Step 425). Step 425 may be essentially the same as Step 325, and the similar details will not be repeated. If the absolute value of the sum of the actual phase currents is less than the open circuit value, motor control module 207 may next execute Step 430. If the absolute value of the sum of the actual phase currents is equal to or greater than the open circuit value, motor control module 207 may next execute Step 435.

If the absolute value of the sum of the actual phase currents is less than the open circuit value, control system 140 may determine if the phase current of the failed current sensor is approximately zero (Step 430). If the actual phase current of the failed current sensor is approximately zero, motor control module 207 may next execute Step 435. If the actual phase current of the failed current sensor is greater than approximately zero, motor control module 207 may next execute Step 450.

If the absolute value of the sum of the actual phase currents is greater than or equal to the open circuit value, or the actual phase current of the failed current sensor is approximately zero, control system 140 may decrement a counter (Step 435). The counter may be an integer tracker. The counter may be used to determine when a failed current sensor has produced correct values a sufficient number of times to requalify a current sensor 150 and thus start using readings from current sensor 150 instead of an estimate of the phase current for that current sensor 150.

Once the counter has been decremented, control system 140 may determine if the counter is less than zero (Step 440). The counter is a measure of how accurate a failed current sensor has recently been. To requalify a failed current sensor, current sensor 150 may need to have been accurate for several sensor samples, that is, a time period long enough to show current sensor 150 is now working correctly. In most cases, requiring current sensor 150 to work correctly for as long a time period as current sensor 150 had failed is unnecessary. This is accomplished by not allowing the counter to go negative. If the counter is less than zero, motor control module 207 may next execute Step 445. If the counter is greater than or equal to zero, motor control module 207 may next execute Step 410.

If the counter is less than zero, control system 140 may reset the counter to zero (Step 445). Once the counter has been reset, and a new sample is available from current sensors 150, Step 410 may be executed next. If the absolute value of the sum of the actual phase currents is less than the open circuit value and the actual phase current of the failed current sensor is greater than approximately zero, control system 140 may increment a counter (Step 450).

Once control system 140 has incremented a counter, control system 140 may determine if the counter is greater than the selected integer (Step 455). As discussed above, the selected integer was determined to give sufficient valid phase current sensor reads before requalifying a failed current sensor. If the counter is less than or equal to the selected integer, Step 410 may be executed. In contrast, if the counter is greater than the selected integer, Step 460 may be executed.

If the counter is greater than the selected integer, control system 140 may requalify the failed current sensor (Step 460). According to one embodiment, when current sensor 150 has been requalified, motor control module 207 may stop estimating the phase current value of the failed current sensor and start using the actual phase current value of current sensor 150 to control the motor.

In another embodiment, the process of flowchart 400 may include comparing the actual phase current from the failed current sensor to the estimate phase current for the failed current sensor. In one example, this additional check might be an additional step and comparison between Step 430 and Step 450. If the actual phase current and the estimated phase current are not within some predetermined and/or user defined range of each other, motor control module 207 would next execute Step 435. If the actual phase current and the estimated phase current are within some predetermined and/or user defined range of each other, motor control module 207 might next execute Step 450.

Control system 140 may also be configured to store relevant performance data and other information in the storage device 202. The information stored may include one or more of the values of the actual phase currents, flexible variables, the present counter value, estimated phase currents, date, time, motor, and power converter. The stored data may be stored in a permanent file, or may be stored in revolving buffer, which can be transferred to a permanent file in the event of an anomaly associated with power electronics system 120 or control system 140.

While certain aspects and features associated with the method described above may be described as being performed by one or more particular components of control system 140, it is contemplated that these features may be performed by any suitable computing system. Furthermore, the order of steps in FIG. 4 is exemplary only and certain steps may be performed before, after, or substantially simultaneously with other steps illustrated in FIG. 4.

INDUSTRIAL APPLICABILITY

Methods and systems consistent with the disclosed embodiments may provide a solution for detecting a failed current sensor and estimating a phase current for the failed current sensor. A control system 140 that employs the processes and features described herein may determine if the sum of the phase currents provided by current sensors 150 is less than an open circuit value. If the sum of the phase currents is not less than an open circuit value, control system 140 may determine which phase current values are approximately zero. If only one phase current is consistently approximately zero, and is not reading other values, that current sensor 150 may have failed. A phase current may be estimated for the failed current sensor by choosing an estimated phase current that may make the sum of the estimated phase current and the other actual phase currents approximately zero. Although the disclosed embodiments are described in connection with a motor and a power converter on machine 100, they may be applicable to any power converter that supplies a motor where it may be advantageous to provide a three-phase machine open current sensor detection and estimation strategy.

The presently disclosed system and method of detecting one or more failed current sensor and estimating a phase current for the failed current sensor may have several advantages. For example, the systems and methods described herein may provide a way to quickly determine if a current sensor 150 has failed and if an estimate can be generated for the phase current of the failed current sensor. The motor may be operable with a failed current sensor because an estimate for that phase current may be reliably substituted for the failed sensor.

Additionally, the disclosed system and method provide a robust way to determine which current sensors 150 may have failed by focusing on the zero crossings. A current sensor 150 that has not failed may be quickly driven off a zero value as the power converter responds to the erroneous values created by the failed current sensor. The failed current sensor may be detected and an estimate used in its place to bring the motor back under control.

Further, the disclosed system and method may provide a way to requalify a current sensor 150 that has been previously identified as having failed. If the failed current sensor starts to operate normally, after being requalified, current sensor 150 may no longer be treated as failed, the estimating may stop, and if another current sensor 150 fails, the motor may not have to be shut down.

It will be apparent to those skilled in the art that various modifications and variations can be made to the disclosed system and method without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims.

What is claimed is:

1. A method of detecting a failed current sensor on an electric machine having a plurality of phases, comprising:
measuring a phase current of each phase of the electric machine using a current sensor;
calculating an open circuit threshold value based on at least one of the measured phase currents;
determining if an absolute value of a sum of the phase currents of the electric machine is below the determined open circuit threshold value;
identifying a failed current sensor by determining which of the phase currents is approximately zero, if the sum of the phase currents of the electric machine is not below the determined open circuit threshold value; and
estimating the phase current for the failed current sensor by determining a phase current value for the failed current sensor that, when added to the phase currents of the remaining current sensors, makes the sum of all the phase currents equal to approximately zero.

2. The method of claim 1, wherein calculating the open circuit threshold value includes calculating a percentage of the at least one phase current.

3. The method of claim 1, wherein determining which of the phase currents is approximately zero includes waiting a first delay period after determining if the absolute value of the sum of the phase currents of the electric machine is below the determined open circuit threshold value.

4. The method of claim 3, further including waiting a second delay period, if less than one of the phase currents, or two or more of the phase currents, are approximately zero, then again determining which of the phase currents is approximately zero.

5. The method of claim 4, further including:
estimating the phase current for the failed current sensor if only one of the phase currents is approximately zero;
determining a non-open circuit current sensor failure if none of the phase currents is approximately zero a predetermined number of times in a row; and determining that two or more current sensors have failed if more than one of the phase currents is approximately zero the predetermined number of times in a row.

6. The method of claim 1, further including:
using the estimated phase current of the failed current sensor to monitor or control performance of the electric machine;
determining if the absolute value of the sum of the phase currents of the electric machine is below the determined open circuit threshold value, based on the measured phase currents; and
determining if the measured phase current of the failed current sensor is greater than approximately zero; and
when it is determined that the measured phase current of the failed current sensor is greater than approximately zero, discontinuing using the estimated phase current of the failed current sensor to monitor or control performance of the electric machine and using the measured phase current of the failed current sensor to monitor or control performance of the electric machine.

7. The method of claim 6, further including:
incrementing a counter if the absolute value of the sum of the measured phase currents of the electric machine is below the open circuit threshold value and the measured phase current of the failed current sensor is greater than approximately zero;
otherwise decrementing the counter; and
when the counter is above a selected integer, discontinuing using the estimated phase current to monitor or control performance of the electric machine and using the measured phase current to monitor or control performance of the electric machine.

8. The method of claim 1, further including detecting the failed current sensor and estimating the phase current for the failed current sensor at every current sensor sample.

9. A system for detecting a failed current sensor on an electric machine, comprising:
at least one electric machine having a plurality of phases;
at least one sensor deployed per each phase of the at least one electric machine and configured to measure a phase current of that phase of the at least one electric machine; and
a controller electrically coupled to the at least one electric machine, the controller configured to:
determine if an absolute value of a sum of the phase currents of the at least one electric machine is below an open circuit threshold value;
delay for a first time period after determining if the absolute value of the sum of the phase currents of the at least one electric machine is below the open circuit threshold value;
after the fist delay period, identify a failed current sensor by determining which of the phase currents is approximately zero, if the absolute value of the sum of the phase currents of the at least one electric machine is not below the open circuit threshold value;
estimate the phase current for the failed current sensor by determining a phase current value for the failed current sensor that, when added to the phase currents of the remaining current sensors, makes the sum of all the phase currents equal to approximately zero.

10. The system of claim 9, wherein the open circuit value is equal to zero.

11. The system of claim 9, wherein the controller is further configured to wait a second delay period, if less than one of the phase currents, or two or more of the phase currents, are approximately zero, and then again determine which of the phase currents is approximately zero.

12. The system of claim 11, wherein the controller is further configured to:
estimate the phase current for the failed current sensor if only one of the phase currents is approximately zero;
determine a non-open circuit current sensor failure if none of the phase currents is approximately zero a predetermined number of times in a row; and
determine that two or more current sensors have failed if more than one of the phase currents is approximately zero the predetermined number of times in a row.

13. The system of claim 9, wherein the controller is further configured to:
use the estimated phase current of the failed current sensor to monitor or control performance of the at least one electric machine;
determine if the absolute value of the sum of the phase currents of the at least one electric machine is below the open circuit threshold value, based on the measured phase currents;
determine if the measured phase current of the failed current sensor is greater than approximately zero; and
when it is determined that the measured phase current of the failed current sensor is greater than approximately zero, discontinue using the estimated phase current of the failed current sensor to monitor or control performance of the at least one electric machine and use the measured phase current of the failed current sensor to monitor or control performance of the at least one electric machine.

14. The system of claim 13, wherein the controller is further configured to:
increment a counter if the absolute value of the sum of the measured phase currents of the at least one electric machine is below the open circuit value and the measured phase current of the failed current sensor is greater than approximately zero;
otherwise decrement the counter; and
when the counter is above a selected integer, discontinue using the estimated phase current of the failed current sensor to monitor or control performance of the at least one electric machine and use the measured phase current of the failed current sensor to monitor or control performance of the at least one electric machine.

15. The system of claim 9, wherein the controller is further configured to detect the failed current sensor and estimate the phase current for the failed current sensor at every current sensor sample.

16. A machine, comprising:
a power source;
at least one electric machine having a plurality of phases;
a current sensor associated with each phase of the at least one electric machine and configured to measure a phase current of that phase of the at least one electric machine; and
a controller electrically coupled to the at least one electric machine, and the controller configured to:
determine if an absolute value of a sum of the measured phase currents of the at least one electric machine is below an open circuit threshold value;
identify a failed current sensor by determining which of the phase currents is approximately zero, if the absolute value of the sum of the phase currents of the at least one electric machine is not below the open circuit threshold value;

estimate the phase current for the failed current sensor by determining a phase current value for the failed current sensor that, when added to the measured phase currents of the remaining current sensors, makes the sum of all the phase currents equal to approximately zero;

use the estimated phase current for the failed current sensor to monitor or control performance of the at least one electric machine;

determine if the absolute value of the sum of the measured phase currents of the at least one electric machine is below the open circuit value and if the measured phase current of the failed current sensor is greater than approximately zero; and if the absolute value of the sum of the measured phase currents of the at least one electric machine is below the open circuit value and the measured phase current of the failed current sensor is greater than approximately zero:

discontinue using the estimated phase current of the failed current sensor for controlling or monitoring the at least one electric machine; and resume using the measured phase current of the failed current sensor for controlling or monitoring the at least one electric machine.

17. The machine of claim 16, wherein the controller is configured to determine which of the phase currents is approximately zero by:

waiting a first delay period after determining if the absolute value of the sum of the phase currents of the at least one electric machine is below the open circuit threshold value;

waiting a second delay period if less than one of the phase currents, or two or more of the phase currents, are approximately zero, then again determining which of the phase currents is approximately zero;

estimating the phase current for the failed current sensor if only one of the phase currents is approximately zero;

determining a non-open circuit current sensor failure if none of the phase currents is approximately zero a predetermined number of times in a row; and determining that two or more current sensors have failed if more than one of the phase currents is approximately zero the predetermined number of times in a row.

18. The machine of claim 16, wherein the controller is configured to:

increment a counter if the absolute value of the sum of the measured phase currents of the at least one electric machine is below the open circuit threshold value and the measured phase current of the failed current sensor is greater than approximately zero;

otherwise decrement the counter; and when the counter is above a selected integer, discontinue using the estimated phase current of the failed current sensor for controlling or monitoring the at least one electric machine, resume using the measured phase current of the failed current sensor for controlling or monitoring the at least one electric machine.

19. The machine of claim 16, wherein the controller is further configured to detect the failed current sensor and estimate the phase current for the failed current sensor at every current sensor sample.

* * * * *